United States Patent
Jackson, Sr.

[11] Patent Number: 6,062,524
[45] Date of Patent: May 16, 2000

[54] STABILIZER

[76] Inventor: Phillip N. Jackson, Sr., 5158 S. 133 East Ave., Tulsa, Okla. 74134

[21] Appl. No.: 09/070,147

[22] Filed: Apr. 30, 1998

[51] Int. Cl.⁷ ....................................................... A47F 5/00
[52] U.S. Cl. .............................. 248/352; 70/232; 280/507
[58] Field of Search ...................................... 248/351, 352, 248/354.1, 354.3, 354.6, 552, 551, 157, 163, 188.5; 70/232, 258; 280/507, 504, 433, 475, 763.1, 764.1, 765.1, 766.1; 403/379.5, 379.2, 355

[56] References Cited

U.S. PATENT DOCUMENTS

| | | | |
|---|---|---|---|
| 3,232,584 | 2/1966 | Miles | 248/166 |
| 3,493,209 | 2/1970 | Brammer | 248/352 |
| 4,014,517 | 3/1977 | Keagle | 248/232 X |
| 4,141,526 | 2/1979 | John | 248/352 |
| 4,245,808 | 1/1981 | John | 248/352 |
| 4,708,362 | 11/1987 | Raetz . | |
| 5,052,203 | 10/1991 | Van Cuyk | 70/232 |
| 5,165,265 | 11/1992 | Maionchi | 70/232 |
| 5,192,055 | 3/1993 | Griggs et al. | 248/354.1 X |
| 5,197,311 | 3/1993 | Clark . | |
| 5,520,030 | 5/1996 | Muldoon | 248/352 X |
| 5,575,492 | 11/1996 | Stone | 280/475 |
| 5,675,997 | 10/1997 | Hulak | 70/14 |
| 5,836,184 | 11/1998 | Brown | 70/178 |
| 5,901,935 | 5/1999 | Lai | 248/354.1 |
| 5,915,672 | 6/1999 | Kickey | 248/352 X |

Primary Examiner—Ramon O Ramirez
Assistant Examiner—Tan Le
Attorney, Agent, or Firm—Robert E. Massa

[57] ABSTRACT

A stabilizer device attachable to a king pin of a fifth wheel recreational vehicle requiring stabilizing for stabilizing the vehicle upon a support surface. A cup device, which is adjustably attachable to a substantially horizontally oriented support device, is positioned to accept a king pin member of the vehicle. The cup includes a locking device attachable thereto for securing the king pin by means of a lock. A screw member is secured to the bottom of the cup and passes through the support device. The screw member is vertically adjustable upon a threaded block member positioned upon the support device. A pair of handles extend sideways from the block member for easy adjustment. A pair of leg members are pivotally attached to the support device and are attached to each other by an adjustable brace device which provides rigid connection of the legs at chosen positions to secure the chosen angle of attachment of the legs to each other.

20 Claims, 4 Drawing Sheets

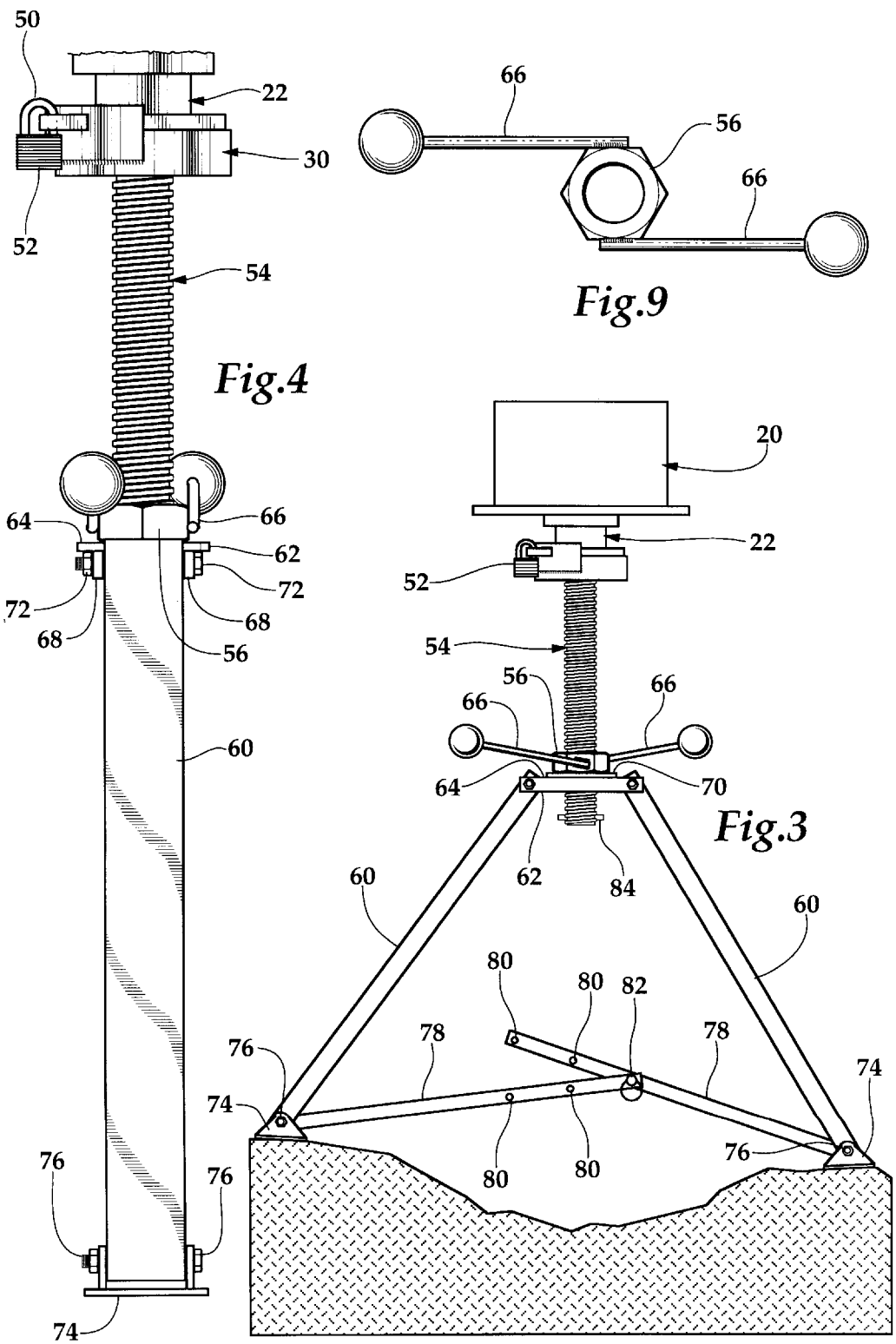

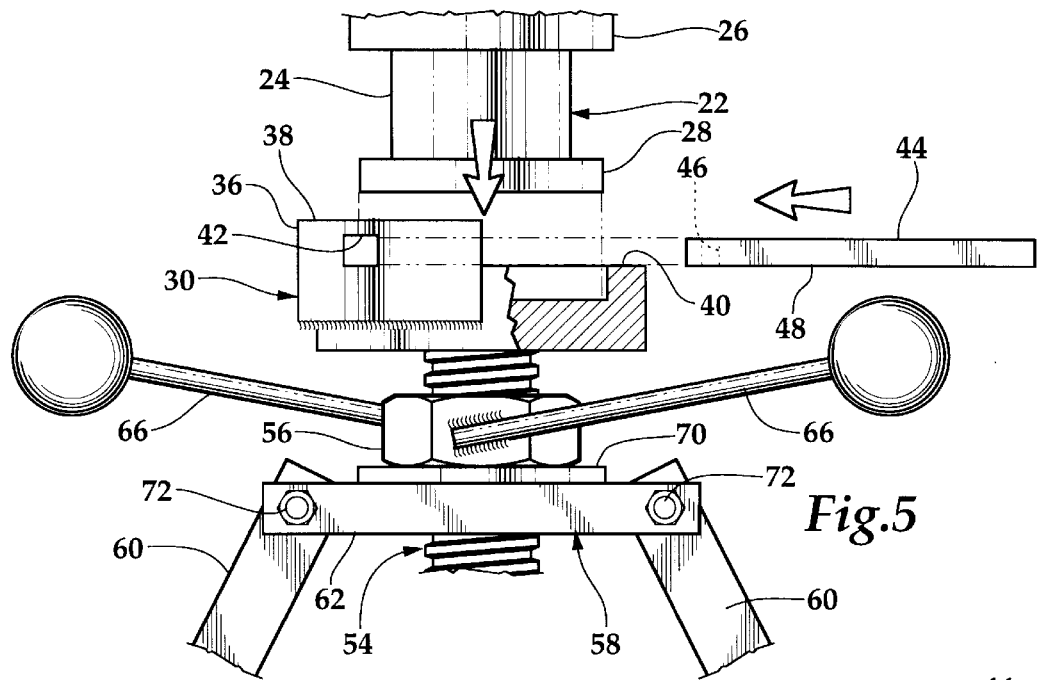
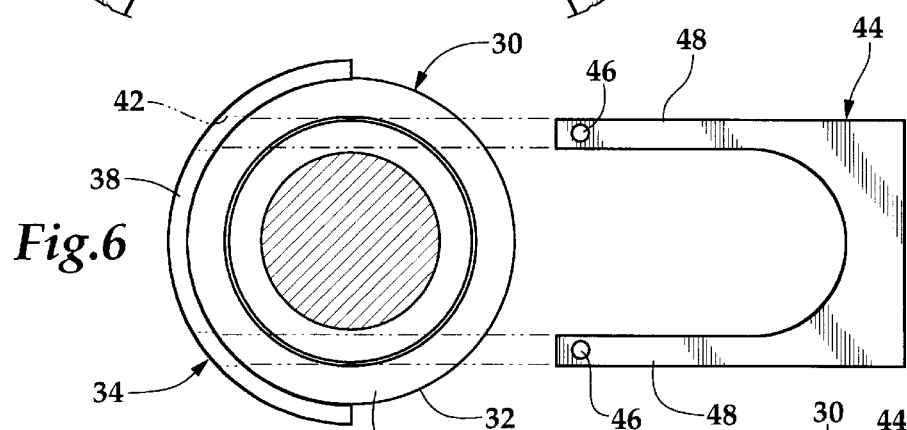
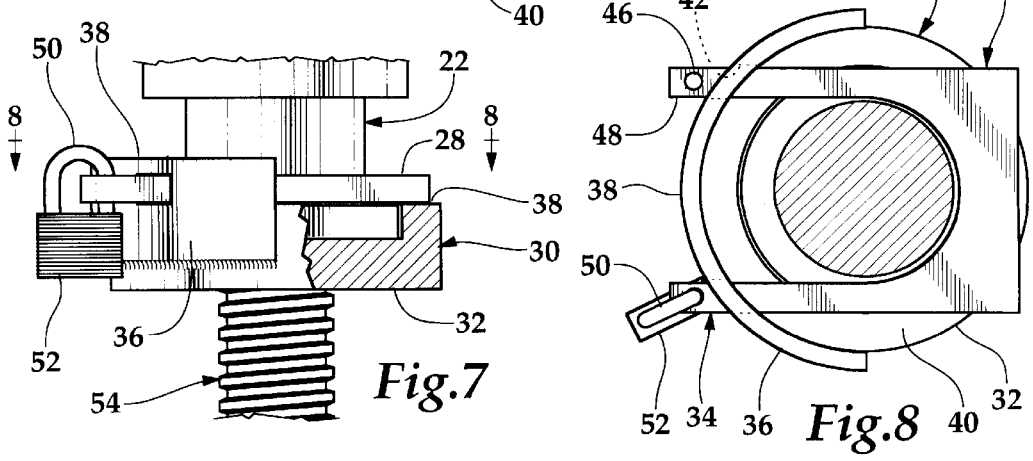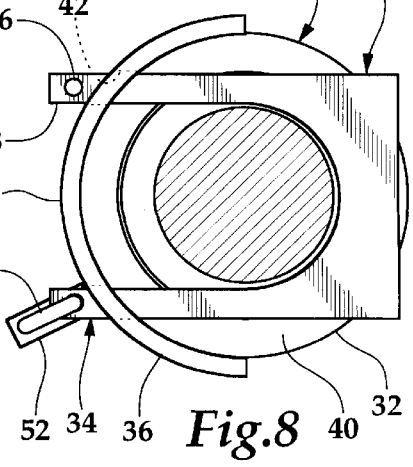

STABILIZER

FIELD OF THE INVENTION

My invention relates to a stabilizer device for stabilizing a vehicle which requires stabilizing, such as a gooseneck trailer recreational vehicle. More particularly, my invention relates to a stabilizer device for supporting a vehicle requiring stabilizing by attachment to a king pin of a vehicle and providing adjustment to a suitable vertical level for the vehicle. Still more particularly, my invention relates to a stabilizing device for providing adjustable and rigid attachment of supporting components to a king pin of a gooseneck trailer vehicle.

BACKGROUND OF THE INVENTION

Various types of recreational vehicles and trailers require supporting and stabilizing in a safe and secure position after the recreational vehicle or trailer has been detached from the cab or truck which been towing the vehicle or trailer.

A vehicle which is constructed to be towed, such as a fifth wheel recreational vehicle, or a camper, or a trailer, conventionally includes an upper portion, or gooseneck portion which extends forwardly a considerable distance at the front of the vehicle. The typical front extension section is constructed to avoid interference with the body members of the towing truck or cab while moving and turning, and the front extension section of the vehicle or trailer includes means for connecting the vehicle to the towing truck or cab.

Thus, the front section extends in an unsupported and unbalanced condition when the recreational vehicle or trailer is detached from the towing truck or cab.

Quite often, the front extension section of a recreational vehicle is designed to incorporate a form of sleeping area or storage space. With this design, the front section becomes increasingly unstable and is in further need of support when the recreational vehicle is separated from the towing truck.

The normal means for temporarily connecting a recreational vehicle or trailer to a towing truck comprises a pivotal apparatus. generally including a king pin secured beneath the front extension portion of the vehicle in cooperation with a form of socket secured on the body of the truck. In this arrangement, the connective device on the recreational vehicle is referred to as a fifth wheel.

Usually, the recreational vehicle or trailer includes a pair of short extension supports beneath the main body of the vehicle and at the very front of the main body and behind the front extension portion of the vehicle, which are lowered into a supporting position to the surface of the ground when the operator is preparing to remove the vehicle from the attachment to the towing truck.

After the operator has disconnected the vehicle from the towing truck, he is then able to attach a form of stabilizing system beneath the front extension portion of the vehicle by attachment to the king pin of the vehicle. After proper adjustment of the stabilizing device to the most satisfactory degree of support of the vehicle, the operator may feel that he and his family will be safe in moving into and utilizing the front extension portion.

Because of my long machine shop knowledge and experience. I was able to recognize some inherent flaws in the various stabilizer devices which I had seen. I solved the problems I saw and soon constructed a stabilizer system which I felt eliminated these problems and designed a stabilizer device which I considered stronger, more secure, and more efficient than the ones I had seen.

In considering the possible manner in which a stabilizer device for a recreational vehicle or trailer might be improved. I eventually developed the invention which I describe herein.

In accordance with the usual practice. I conducted a patent search which revealed the following patents which were considered to be the closest to my invention:

| U.S. No. 4,708,363 | Raetz | Nov. 24, 1987 |
| U.S. No. 5,197,311 | Clark | March 30, 1993 |

U.S. Pat. No. 4,708.363 to Raetz describes a stabilizer device for a recreational vehicle upon a support surface. The vehicle includes a connector pin which extends from a strike plate on the vehicle to fit into an elongated neck member rigidly attached to a base member of the device. The base member includes a pair of downwardly extending flange members. A pair of leg members are pivotally attached to the flange members by pins which permit pivotal movement of the legs. A shoe member is pivotally attached to each leg member. Then the leg members may be adjustably drawn toward each other by means of a tensioning device connecting the leg members to each other.

U.S. Pat. No. 5,197,311 to Clark comprises a lockable stabilizer device which comprises a lockable collar securable to the king pin of a recreational vehicle. The collar comprises a pair of semicylindrical half collars each of which include oversized slots for receipt of a U-shaped locking clevis. The stabilizer device is securable in position upon the vehicle king pin by positioning the collar halves on opposite sides of the king pin and inserting the legs of the U-shaped locking clevis through the slots of the collar halves and locking a yoke member upon the extremities of the U-shaped clevis which extend through the slots.

SUMMARY OF THE INVENTION

The primary object of my invention is to provide a stabilizer device for a recreational vehicle which is simple in construction, in operation, and easily attachable to the vehicle.

Another object of my invention is to provide a stabilizer device for a recreational vehicle or trailer which will give sturdy support for the vehicle to which it is attached.

Still another object of my invention is to provide a stabilizer device for a fifth wheel vehicle which will give easily adjustable firm support in relation to the surrounding area.

Still another object of my invention is to provide a stabilizer device for fifth wheel vehicles which is easily and quickly attachable to the vehicle and can be lockable in place for safe and secure protection.

I have developed a stabilizer device for fifth wheel vehicles which has a combination of beneficial characteristics not found in prior art stabilizer devices. I have been familiar with many previous stabilizer devices for many years and eventually developed a stabilizer device of my own which I felt included a number of combined benefits not found in the previous devices.

I wanted a stabilizer which would be easy to place in position, would be sturdy, give secure support, and would be easily adjustable to the vehicle's positions, and would include locking components to protect the stabilizer from unwarranted removal. Not only would the locking component secure my stabilizer device from theft, but it will assure the occupants that there can be no sudden and unexpected wobbling and shaking of the vehicle due to a sudden removal of the stabilizer device either by accidental removal or because of a prank perpetrated upon the occupants.

I designed my stabilizer device in a manner that it would be easily and precisely adjustable over an extensive vertical adjustment distance because I use a firm acme screw member as a vertical support member. The acme screw support member provides minute adjustment control to accommodate the structure of the vehicle to which the stabilizer device is attached and the terrain upon which the stabilizer device rests. For ease in making simple adjustments, I have provided an adjustment nut member with preferably a pair of sideways extending handles, with the nut cooperating with the acme screw to provide the adjustment capability of the acme screw. The sideways extending handles are long enough to be easily reached by a person standing adjacent the front end of the vehicle near the stabilizer device.

The adjustment nut is preferably a hex nut, and rests freely upon a horizontal pivot arm connecting the legs of the stabilizer device. The acme screw is held securely in stationary position, in attachment, as by welding, to a cup member upon which the king pin of the recreational vehicle rests and to which the king pin may be locked.

In providing for locking my stabilizer device securely to the king pin of a recreational vehicle. I accomplish this by welding the acme screw to the cup to which the king pin may be locked and by preventing the detachment of the acme screw from both the adjustment nut member and the legs of the stabilizer device. I have arranged for the acme screw to pass functionally through the hex nut positioned upon the horizontal pivot arm and for the acme screw to pass non-functionally through an opening in the pivot arm aligned with the hex nut, and with the acme screw to have a pin member or other form of obstruction member secured to, or welded to, the acme screw near the lower end in a manner to prevent the acme screw from passing upward through the opening in the pivot arm. Thus, when the king pin is locked in position on the cup member, the stabilizer device cannot be detached from the king pin.

I have designed the legs of my stabilizer device to provide a pair of legs which may be firmly and securely adjusted, as to vertical support for the stabilizer device, horizontal divergence of the legs, and firm horizontal attachment of the legs.

One manner of vertical adjustment of the pair of legs is in coordination with the adjustment of the acme screw. As the vertical adjustment of the pivot arm, either up or down on the acme screw is performed, the legs may be moved, either closer together or farther apart, in coordination with the movement along the acme screw, and in coordination with the adjustment of the legs, either closer together or farther apart, as necessary, by adjustment of an adjustable leg brace adapted to rigidly and firmly secure the legs in position. In coordination with adjustment of the legs with the pivot arm along the acme screw, the adjustable leg brace, formed of two or more rigid members, and which attaches the two legs together, may be securely positioned as I show.

A preferred embodiment of my invention comprises a cup component positioned to accept a king pin of a vehicle, with a locking device formed on said cup to lock the stabilizer device to the vehicle. The locking device comprises a receptor wall portion of the cup having an upper edge higher than an adjacent upper edge of the cup and with a transverse opening near one end, and including a locking clip having a body and a pair of parallel legs positioned upon the adjacent upper edge of the cup to engage an area of reduced diameter of the king pin and having a leg adaptable to enter and exit the transverse opening, the exiting leg portion having an opening near an end to receive a lock shackle. A screw member is secured to the bottom of the cup in line with the axis of the king pin to provide vertical adjustment of the stabilizer device. An interiorly threaded block member is positionable upon the cup member to cooperate with the screw member to provide adjustment for the stabilizer device. A support component comprises a pivot arm member which has a flat upper surface upon which the block member rests supportedly. The stabilizer device includes a pair of leg members pivotally connected at their upper ends adjacent opposite extremities of the pivot arm to extend downwardly for adjustable support of the stabilizer device upon the support surface, and an adjustable brace component connects the leg members near the lower extremities of each leg member to provide rigid connection of the leg members at chosen positions. Preferably, the screw member is an acme type screw to provide precise vertical adjustment of the stabilizer device.

I shall subsequently describe in detail other major features of my stabilizer device.

Then, the above objects and advantages of my invention will become apparent from my description of the following preferred embodiments of my invention.

BRIEF DESCRIPTION OF THE DRAWINGS

FIG. 3 is a front elevational view of a stabilizer device according to my invention illustrating the stabilizer device in adjustable position upon an uneven surface.

FIG. 4 is an enlarged side elevational view of a stabilizer device according to my invention.

FIG. 5 is a partial front elevational view of a stabilizer device according to my invention in an initial operating movement.

FIG. 6 is a partial top view of a stabilizer device according to my invention showing the locking component as illustrated in FIG. 5.

FIG. 7 is a partial front elevational view of a stabilizer device according to my invention showing a locking component in lockable position.

FIG. 8 is a top view of a stabilizer device according to my invention along the lines of 8—8 of FIG. 7.

FIG. 9 is a partial top view of a stabilizer device according to my invention showing means for vertical adjustment of the stabilizer device.

DESCRIPTION OF THE PREFERRED EMBODIMENTS

Figure 1:
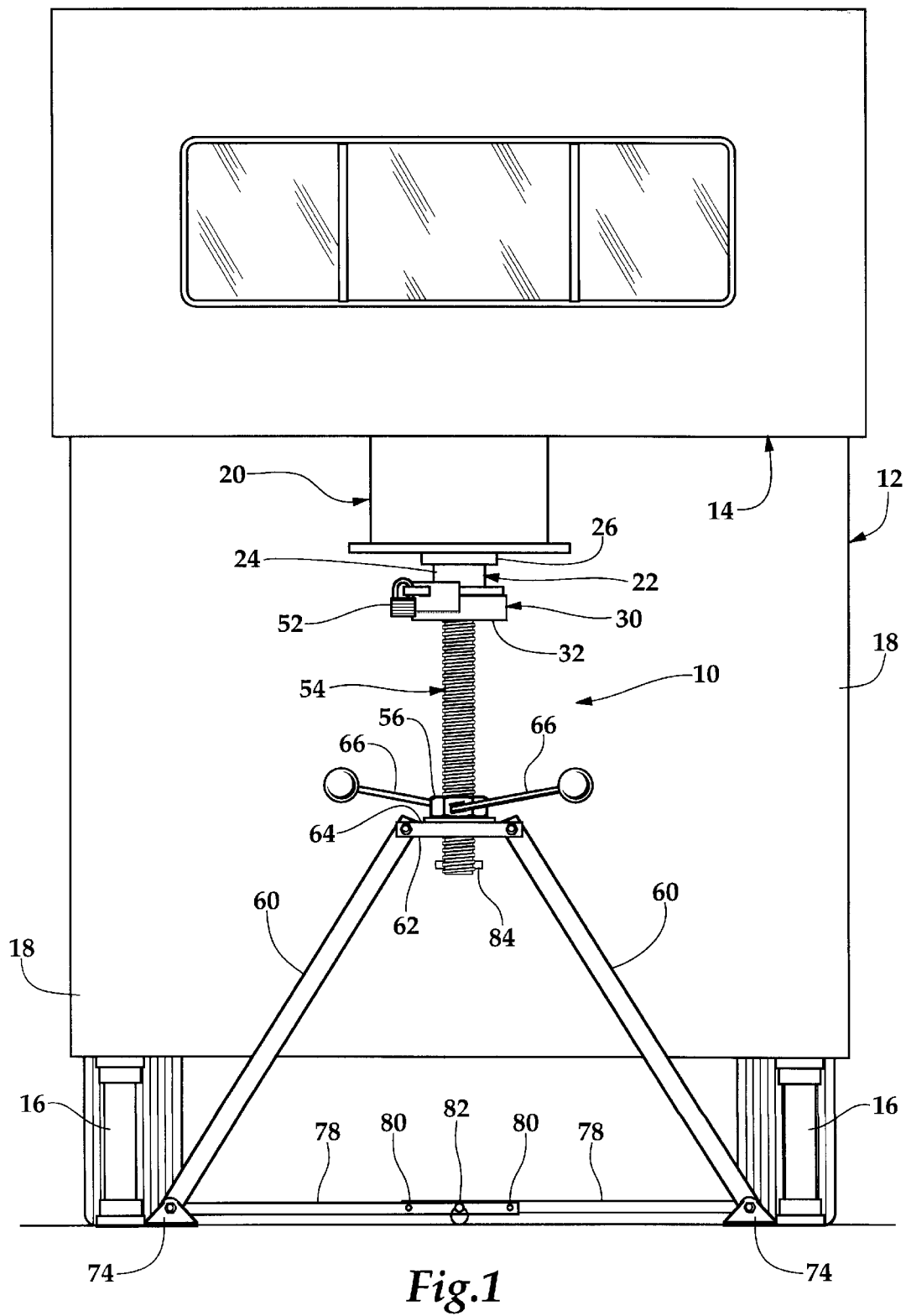
FIG. 1 is a front elevational view of a preferred embodiment of a stabilizer device according to my invention showing the stabilizer device in supportive position with a typical fifth wheel vehicle.
Figure 2:
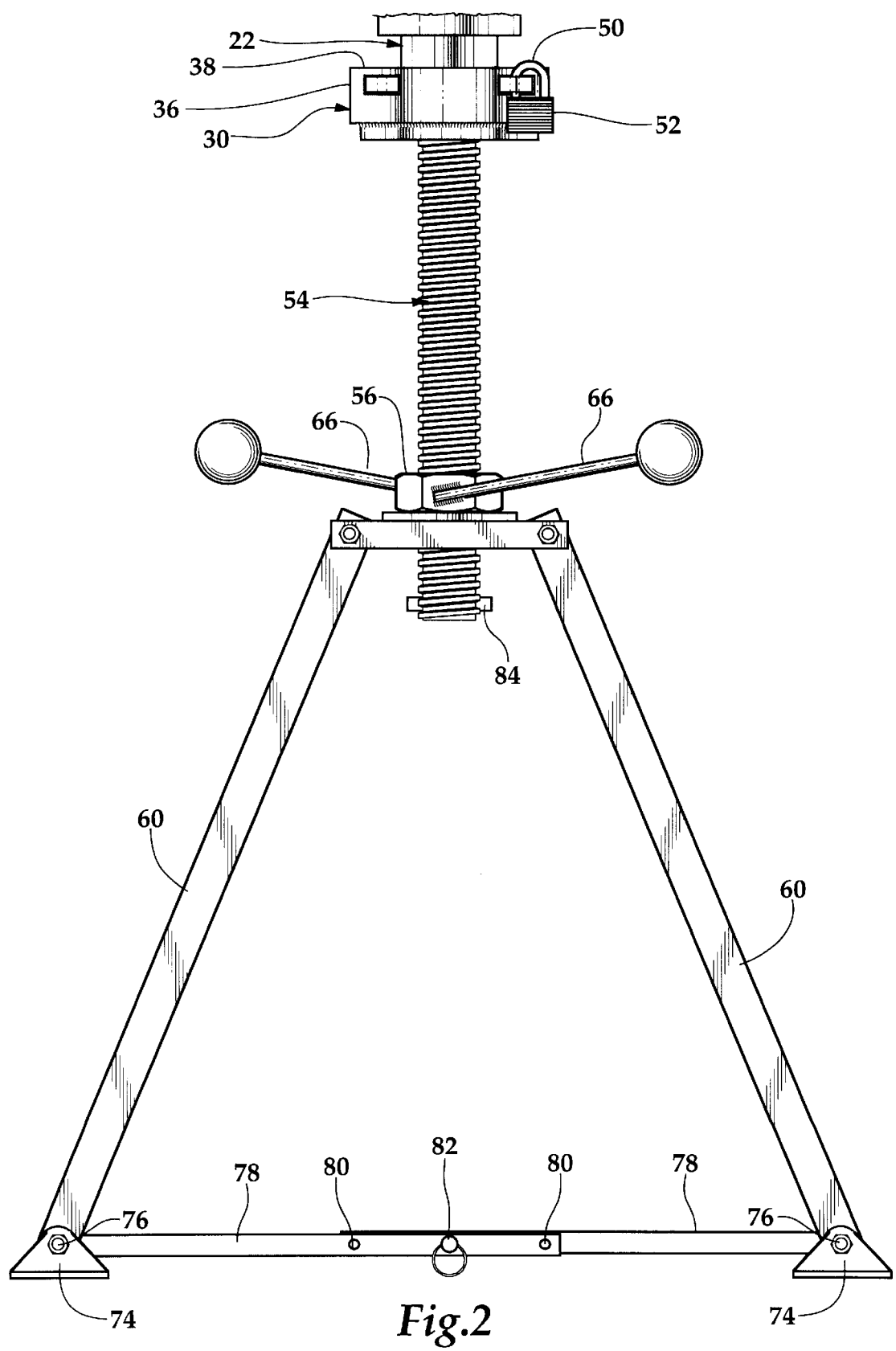
FIG. 2 is an enlarged front elevational view of a stabilizer device according to my invention.

In FIG. 1 I describe a stabilizer device 10, generally, according to my invention, as it is placed in usual support position for a fifth wheel vehicle 12, generally. A typical fifth wheel vehicle 12, generally, includes a front extension section 14, generally, which usually requires some form of steadying support so that the occupants of the vehicle may safely and securely occupy the front section for sleeping or storage. Quite often, a fifth wheel vehicle, such as a recreational vehicle, might be equipped with a pair of support rods 16, but these are operable in position at the lower front end 18 of the vehicle 12 after the vehicle has been removed from its towing vehicle (not shown). I show my stabilizer device alone in an enlarge view of FIG. 2 and in the side view of FIG. 4.

For the purpose of towing a recreational vehicle, a fifth wheel 20, generally, is secured beneath the front extension section 14, and includes a king pin 22, generally, to which, subsequently, my stabilizer device 10 may be easily and securely attached.

King pin 22, generally, comprises a spool-shaped component including a cylindrical portion of reduced diameter 24, in relation to the cylindrical portions of larger diameters, upper portion 26 and lower portion 28 of king pin 22, as shown in enlarged manner in FIG. 5.

I have provided a cup 30, generally, positionable to accept king pin 22, Cup 30 includes a shallow receiving cup 32 in which king pin 22 is received.

I have designed cup 30 to include locking device 34, generally, as I show in FIGS. 6, 7, and 8, which comprises a receptor wall portion 36 secured a considerable distance around the cup 30 and having an upper edge 38 extending above an upper edge 40 of receiving cup 32. Receptor wall portion 36 includes at least one transverse opening 42 therethrough so that a locking clip may pass through the opening 42 and be secured with an ordinary lock. A flat locking clip 44, generally, is preferably U-shaped to fit snugly around an area of reduce diameter 24 of the king pin, and includes an opening 46 in each leg 48 which are adaptable to receive a clevis 50 of lock 52.

Openings 42 in the receptor wall 36, upper edge 40 of receiving cup 32, lower portion 28 of king pin 22, and openings 46 in the legs 44, are all formed and positioned to provide a close, smooth, and secure attachment means for locking king pin 22 in place.

I have designed my stabilizer device to provide accurate and precise adjustment for the vertical positioning of the king pin 22 and cup 30 by securing an acme type screw member 54, generally, within a vertically disposed receptacle or bored area (not shown) within the bottom of the cup 30. The acme screw 54 is placed in line with the axis of the king pin 22 and should be of a suitable thread size to permit precise adjustment of the king pin.

Preferably, the acme screw 54 has an upper end secured within a bored section of the cup 30 to give the stabilizer device better security than just being surface joined. Acme screw member 54 cooperates with an interiorly threaded block member 56 in providing this vertical adjustment because I have designed block member 56 to be positioned upon a support component 58, generally, which may be suitable vertically adjusted by movement of a pair of legs 60 to which support member 58 is pivotally attached.

Support component 58 comprises a pivot arm member 62 having a flat upper surface 64 upon which block member 56 is positioned. Pivot arm 62 includes a central opening (not shown) in line with the axis of the king pin 22 and through which the acme screw 54 passes freely or non-functionally so that actual adjustment of the king pin height is accomplished by cooperation of the block member 56 resting upon pivot arm 62.

Adjustment of the block member 56 is made by hand movement of a sideways extending handle 66 secured to block member 56, shown in FIG. 9.

For strength and ease of operation, pivot arm 62 is provided with a smooth upper surface, rectangular shape, and side flanges 68.

For simple operation, block member 56 may rotate directly against the upper surface 64 of the pivot arm 62, but I have found that the rotation of block member 56 is smoother and more efficient by placing a flat washer 70 between the flat surface 64 and the block member 56.

Flanged leg members 60 are held in pivotal position with and against pivot arm 62 by pins 72 for free movement as needed, and each leg 60 has a foot pad 74 held in pivotal attachment to its lower extremity by a pin 76.

I have designed my stabilizer device to be easily adjusted to accommodate the proper positioning of the block member 56 on the acme screw 54 in relation to the structure of the recreational vehicle 12, the terrain upon which the recreational vehicle is to be parked, and the length of the legs 60. I show in FIGS. 1, 2, and 3 the manner in which I am able to adjust my stabilizer device. I have provided two or more brace members 78 connecting legs 60. Brace members 78 are pivotally connected to the legs 60 and held in position on legs 60 by the pin 76 which are also holding foot pads 74 in place. I have provided brace members 78 with means for adjusting and securing the distance between the legs 60 by making a series of adjustment bores 80 in each brace member 78 so that a proper bore 80 may be chosen into which a securing nut and bolt 82 may be tightly secured for rigid positioning of the brace members 78 at the chosen position.

As I mentioned above, I have designed my stabilizer device to be lockable in position upon the king pin 22 by placing an obstruction near the bottom of the acme screw 54. I show in FIGS. 1, 2, and 3 one manner in which I provide this is by welding a pin 84 in position near the lower extremity of the acme screw 54. When the stabilizer device is locked in position, the device cannot be removed from the king pin 22 or removed from the bottom of the acme screw 54.

Initially, as may readily be seen, my stabilizer device 10 may be carried disassembled and stored in a small enclosure within the recreational vehicle or towing vehicle. Then, when a suitable area is chosen for parking the recreational vehicle, the recreational vehicle is placed in position and the towing vehicle is detached by release of the king pin 22 from the towing apparatus. Then, the stabilizer device 10 is assembled and placed in position with king pin 22 placed into cup 30. Legs 60 are extended properly with foot pads 74 placed solidly into position, and brace member 78 adjusted securely, block member 56 adjusted to secure position on the acme screw member 54, and, if then desired, the locking components may be attached on the cup 30. The stabilizer device may be locked in position to guard against unwanted removal.

Since many different embodiments of my invention may be made without departing from the spirit and score thereof, it is to be understood that the specific embodiments described in detail herein are not to be taken in a limiting sense, since the scope of the invention is best defined by the appended claims.

I claim:

1. A stabilizer device attachable to a king pin of a vehicle requiring stabilizing upon a support surface, comprising:
    a cup member positioned to accept therein said king pin,
    a locking device formed on said cup component adapted to lock said stabilizer device to said vehicle, comprising:
        a receptor wall portion of said cup having an upper edge higher than an adjacent upper edge of said cup and with a transverse opening near an end, and a locking clip including a body and a pair of parallel legs positionable upon said adjacent upper edge of said cup to engage an area of reduced diameter of said king pin and having a leg adaptable to enter and exit said transverse opening having an opening near end to receive a lock shackle, a screw member secured to bottom of said cup in line with the axis of said king pin to provide vertical adjustment of said stabilizer device, an interiorly threaded block member to cooperate with said screw member in providing said adjustment, a support device comprising a pivot arm member having a flat upper surface upon which said block member rests supportedly, a pair of leg members pivotally connected at their upper ends adjacent opposite extremities of said pivot arm to extend downwardly for adjustable support of said device stabilizer upon said support surface, and an adjustable brace device connecting said leg members near lower extremities of each leg member to provide rigid connection of said leg members at chosen positions.

2. A stabilizer device as described in claim 1, wherein:

said screw member comprises an acme type screw to provide for accurate vertical adjustment of said stabilizer, said screw member includes an upper end secured within a vertically bored area of said cup to provide added stability to said screw, and said block member is acme type threaded to cooperate with said acme type screw.

3. A stabilizer device as described in claim 2, wherein:

said block member includes a handle extending in sideways direction to provide means for easy vertical adjustment of said screw member.

4. A stabilizer device as described in claim 3, wherein:

said pivot arm includes a vertical opening in axial alignment with said king pin, said screw member passing freely through said vertical opening.

5. A stabilizer device as described in claim 4, wherein:

said pivot arm comprises a rectangular pivot arm having a planar horizontal surface providing support for said block member, said pivot arm having a pair of downwardly depending flange members, and each flange member has a pair of oppositely positioned aligned openings near each end to receive therethrough a pin pivotally connecting a leg member.

6. A stabilizer device as described in claim 5, wherein:

each leg member includes a pair of parallel side flange members, and each flange member has a pair of aligned horizontally directed openings to receive said pin members for connecting a leg member to said pivot arm.

7. A stabilizer device as described in claim 6, which includes:

a first foot pad pivotally connected to a first leg member to incorporate a flat bearing surface to rest upon said support surface.

8. A stabilizer device as described in claim 7, which includes:

a second foot pad pivotally connected to a second leg member to incorporate a flat bearing surface to rest upon said support surface.

9. A stabilizer device as described in claim 8, wherein:

said first and second leg members have openings through said flange members near each lower extremity, and said first and second foot pads each include a vertically extending flat member having an opening through each of which a pin passes in pivotal arrangement with said openings in said first and second leg members in connecting said foot pads.

10. A stabilizer device as described in claim 9, wherein:

said brace component comprises two brace members adjustably attached.

11. A stabilizer device attachable to a king pin of a vehicle requiring stabilizing upon a support surface, comprising:

a cup component of cylindrical shape positioned to accept therein said king pin, a locking device formed on said cup component adapted to lock said stabilizer device to said vehicle, comprising:

a cylindrically shaped receptor area on a wall portion of said cup having an upper edge higher than an adjacent upper edge of said cup and having a transverse opening near an end, and a U-shaped locking clip including a body and a pair of parallel legs positionable upon said adjacent upper edge of said cup to engage an area of reduced diameter of said king pin, and having a leg adaptable to enter and exit said transverse opening of said receptor having an opening near an end to receive a lock shackle, a screw member secured to bottom of said cup in line with the axis of said king pin to provide vertical adjustment of said stabilizer device, an interiorly threaded block member to cooperate with said screw member in providing said adjustment, a support device comprising a pivot arm member having a flat upper surface upon which said block member rests supportedly, a pair of leg members pivotally connected at their upper ends adjacent opposite extremities of said pivot arm to extend downwardly for adjustable support of said stabilizer device upon said support surface, and an adjustable brace device connecting said leg members near lower extremities of each leg member to provide rigid connection of said leg members at chosen positions.

12. A stabilizer device as described in claim 11, wherein:

said screw member comprises an acme type screw to provide for accurate vertical adjustment of said stabilizer, said screw member includes an upper end secured within a vertically bored area of said cup to provide added stability to said screw, and said block member is acme type threaded to cooperate with said acme type screw.

13. A stabilizer device as described in claim 12, wherein:

said block member includes a pair of handles extending in opposite sideways directions to provide means for easy vertical adjustment of said screw member.

14. A stabilizer device as described in claim 13, wherein:

said pivot arm includes a vertical opening in axial alignment with said king pin, said screw member passing freely through said vertical opening.

15. A stabilizer device as described in claim 14, wherein:

said pivot arm comprises a rectangular pivot arm having a planar horizontal surface providing support for said block member, said pivot arm having a pair of downwardly depending flange members, and each flange member has a pair of oppositely positioned aligned openings near each end to receive therethrough a pin pivotally connecting a leg member.

16. A stabilizer device as described in claim 15, wherein:

each leg member includes a pair of parallel side flange members, and each flange member has a pair of aligned horizontally directed openings to receive said pin members for connecting a leg member to said pivot arm.

17. A stabilizer device as described in claim 16, which includes:

a first foot pad pivotally connected to a first leg member to incorporate a flat bearing surface to rest upon said support surface.

18. A stabilizer device as described in claim 17, which includes:

a second foot pad pivotally connected to a second leg member to incorporate a flat bearing surface to rest upon said support surface.

19. A stabilizer device as described in claim 18, wherein:

said first and second leg members have openings through said flange members near each lower extremity, and said first and second foot pads each include a vertically extending flat member having an opening through each of which a pin passes in pivotal arrangement with said opening in said first and second leg members in connecting said foot pads.

20. A stabilizer device as described in claim 19, wherein:

said brace component comprises two brace members adjustably attached.

* * * * *

UNITED STATES PATENT AND TRADEMARK OFFICE
CERTIFICATE OF CORRECTION

PATENT NO. : 6,062,524
DATED : May 16, 2000
INVENTOR(S) : Jackson, Sr.

It is certified that error appears in the above-identified patent and that said Letters Patent is hereby corrected as shown below:

On the Title page of the patent under [76] Inventor, make the following changes:
    Change address street number "5158" to ---3158---.

Signed and Sealed this

Sixth Day of March, 2001

Attest:

NICHOLAS P. GODICI

*Attesting Officer*    *Acting Director of the United States Patent and Trademark Office*